(12) United States Patent
Min

(10) Patent No.: US 11,231,637 B2
(45) Date of Patent: Jan. 25, 2022

(54) LENS DRIVING DEVICE AND CAMERA DEVICE COMPRISING SAME

(71) Applicant: LG INNOTEK CO., LTD., Seoul (KR)

(72) Inventor: Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/980,642

(22) PCT Filed: Apr. 2, 2019

(86) PCT No.: PCT/KR2019/003880
§ 371 (c)(1),
(2) Date: Sep. 14, 2020

(87) PCT Pub. No.: WO2019/194541
PCT Pub. Date: Oct. 10, 2019

(65) Prior Publication Data
US 2021/0018819 A1    Jan. 21, 2021

(30) Foreign Application Priority Data

Apr. 5, 2018    (KR) .................. 10-2018-0039680

(51) Int. Cl.
*G03B 5/02* (2021.01)
*G02B 7/02* (2021.01)
*H02K 41/035* (2006.01)

(52) U.S. Cl.
CPC .............. *G03B 5/02* (2013.01); *G02B 7/022* (2013.01); *G03B 2205/0069* (2013.01); *H02K 41/0354* (2013.01)

(58) Field of Classification Search
None
See application file for complete search history.

(56) References Cited

U.S. PATENT DOCUMENTS

| 2015/0070781 | A1  | 3/2015  | Cheng et al. |
|---|---|---|---|
| 2015/0316744 | A1  | 11/2015 | Chen |
| 2017/0094187 | A1* | 3/2017  | Sharma ................ G02B 27/646 |
| 2017/0315376 | A1* | 11/2017 | Hu ............................. G02B 7/09 |
| 2018/0031860 | A1* | 2/2018  | Bachar ................ G02B 13/001 |
| 2018/0067379 | A1* | 3/2018  | Rho ......................... G03B 3/10 |

(Continued)

FOREIGN PATENT DOCUMENTS

| CN | 105301733 A | 2/2016 |
|---|---|---|
| CN | 105717726 A | 6/2016 |
| CN | 105988262 A | 10/2016 |

(Continued)

*Primary Examiner* — Clayton E. LaBalle
*Assistant Examiner* — Dennis Hancock
(74) *Attorney, Agent, or Firm* — Birch, Stewart, Kolasch & Birch, LLP

(57) ABSTRACT

The present embodiment relates to a lens driving device comprising: a housing comprising a first hole and a second hole; a first bobbin disposed in the first hole of the housing; a second bobbin disposed in the second hole of the housing; a first coil disposed on the first bobbin; a second coil disposed on the second bobbin; a first magnet disposed in the housing to face the first coil; a second magnet facing the second coil; and a third magnet disposed between the first coil and the second coil.

21 Claims, 11 Drawing Sheets

(56) References Cited

U.S. PATENT DOCUMENTS

2018/0213131 A1* 7/2018 Liu .......................... G02B 7/04
2019/0181726 A1* 6/2019 Kuo ......................... G03B 3/10

FOREIGN PATENT DOCUMENTS

| | | | |
|---|---|---|---|
| CN | 106468812 | A | 3/2017 |
| CN | 106873121 | A | 6/2017 |
| CN | 206585642 | U | 10/2017 |
| CN | 107407788 | A | 11/2017 |
| CN | 107765392 | A | 3/2018 |
| EP | 3 627 219 | A1 | 3/2020 |
| JP | 2011-85666 | A | 4/2011 |
| KR | 10-2017-0108979 | A | 9/2017 |
| KR | 10-2017-0122469 | A | 11/2017 |
| WO | WO 2017/043849 | A1 | 3/2017 |

* cited by examiner

LENS DRIVING DEVICE AND CAMERA DEVICE COMPRISING SAME

CROSS REFERENCE TO RELATED APPLICATIONS

This application is the National Phase of PCT/KR2019/003880 filed on Apr. 2, 2019, which claims priority under 35 U.S.C. § 119(a) to Patent Application No. 10-2018-0039680 filed in the Republic of Korea on Apr. 5, 2018, all of which are hereby expressly incorporated by reference into the present application.

TECHNICAL FIELD

The present embodiment relates to a lens driving device and a camera device comprising the same.

BACKGROUND ART

The content described below provides background information for this embodiment, but does not describe the prior art.

As the spread of various mobile terminals is widely generalized and wireless Internet services are commercialized, the demands of consumers related to the mobile terminals are also diversified, and various types of additional devices are mounted on the mobile terminals.

A representative one is a camera device that photographs a subject as a photo or video. Meanwhile, a dual camera device has been researched recently, because each camera in the dual camera device can photograph different portion, and the two photographed images can be combined into a single image, it is possible to photograph images that cannot be photographed with the existing single camera device.

Meanwhile, in a dual camera device, customers' needs to decrease the separation distance between the optical axes of the two camera devices are increasing, however, when two camera devices are deployed, due to magnetic field interference, a separation distance between the two camera devices is required, so there is a problem that it is difficult to deploy in proximity.

DETAILED DESCRIPTION OF THE INVENTION

Technical Subject

This embodiment is to provide a dual camera device that does not generate magnetic field interference between magnets when driving OIS. Meanwhile, it is to provide a lens driving device for the dual camera device of this embodiment.

Technical Solution

A lens driving device according to the present embodiment may comprise: a housing comprising a first hole and a second hole; a first bobbin disposed in the first hole of the housing; a second bobbin disposed in the second hole of the housing; a first coil disposed on the first bobbin; a second coil disposed on the second bobbin; a first magnet disposed in the housing to face the first coil; a second magnet facing the second coil; and a third magnet disposed between the first coil and the second coil.

The lens driving device may further comprise a third coil facing at least one among the first magnet to the third magnet.

The lens driving device may further comprise a base spaced apart from the housing, and the third coil may be disposed on the base.

The polarity of one surface of the first magnet facing the first coil may be different from the polarity of one surface of the second magnet facing the second coil.

The polarity of one surface of the third magnet facing the first coil is the same as the polarity of the one surface of the first magnet, and the polarity of the other surface of the third magnet facing the second coil may be the same as the polarity of the one surface of the second magnet.

The third magnet is disposed to face the first coil and the second coil, the N pole of the third magnet may face the first coil, and the S pole may face the second coil.

The lens driving device may comprise: a fourth magnet disposed on the first bobbin; a fifth magnet disposed on the second bobbin; a first Hall sensor disposed in the housing and facing the fourth magnet; and a second Hall sensor disposed in the housing and facing the fifth magnet, wherein each of the fourth magnet and the fifth magnet may be disposed to face a corner formed between adjacent lateral walls of the housing.

The housing comprises: a first lateral wall and a second lateral wall disposed opposite to each other; and third to fifth lateral walls disposed between the first lateral wall and the second lateral wall; the third lateral wall is disposed outside the first hole, the fourth lateral wall is disposed outside the second hole, and the fifth lateral wall is disposed between the first hole and the second hole; and the first Hall sensor may be disposed at a corner formed between the first lateral wall and the third lateral wall, and the second Hall sensor may be disposed at a corner formed between the first lateral wall and the fourth lateral wall.

The first magnet comprises a 1-1 magnet disposed on the first lateral wall, a 1-2 magnet disposed on the second lateral wall, and a 1-3 magnet disposed on the third lateral wall; the second magnet comprises a 2-1 magnet disposed on the first lateral wall, a 2-2 magnet disposed on the second lateral wall, and a 2-3 magnet disposed on the fourth lateral wall; and the third magnet may be disposed on the fifth lateral wall.

The lens driving device may further comprise a sixth magnet disposed on the first bobbin opposite to the fourth magnet with respect to the central axis of the first bobbin; and a seventh magnet disposed on the opposite side of the fifth magnet with respect to the central axis of the second bobbin on the second bobbin.

The outer surface of the fourth magnet and the outer surface of the sixth magnet may have different polarities from the inner surface of the first magnet.

The lens driving device further comprises: a first elastic member connecting the first bobbin and the housing; a second elastic member connecting the second bobbin and the housing; a substrate disposed on the base and comprising the third coil; a first wire connecting the first elastic member and the substrate; and a second wire connecting the second elastic member and the substrate, wherein each of the first elastic member and the second elastic member comprises four units spaced apart from each other, each of the first wire and the second wire comprises four wires spaced apart from each other, the first elastic member and the first wire electrically connect the first Hall sensor and the substrate, and the second elastic member and the second wire may electrically connect the second Hall sensor and the substrate.

The first wire and the second wire comprise a total of eight wires, wherein the eight wires are arranged two at each of the four corners of the housing, or four of the eight wires are disposed one at each of the four corners of the housing, and the remaining four wires may be disposed between the first magnet and the second magnet.

A lens driving device according to the present embodiment comprises: a housing comprising a first hole and a second hole; a first bobbin disposed in the first hole of the housing; a second bobbin disposed in the second hole of the housing; a first coil disposed on the first bobbin; a second coil disposed on the second bobbin; a first magnet facing the first coil; and a second magnet facing the second coil, wherein a polarity of one surface of the first magnet facing the first coil may be different from a polarity of one surface of the second magnet facing the second coil.

A camera device according to the present embodiment comprises a housing comprising a first hole and a second hole; a first bobbin disposed in the first hole of the housing; a second bobbin disposed in the second hole of the housing; a first lens coupled to the first bobbin; a second lens coupled to the second bobbin; a first coil disposed on the first bobbin; a second coil disposed on the second bobbin; a first magnet disposed in the housing and facing the first coil and the second coil; a printed circuit board disposed spaced apart from the housing; a first image sensor disposed on the printed circuit board at a position corresponding to the first lens; a second image sensor disposed at a position corresponding to the second lens on the printed circuit board; a base disposed between the housing and the printed circuit board; a third coil disposed on the base and facing the first magnet; a second magnet disposed on the first bobbin; a third magnet disposed on the second bobbin; a first Hall sensor disposed in the housing and facing the second magnet; and a second Hall sensor disposed in the housing and facing the third magnet.

Advantageous Effects

Through the present embodiment, when driving OIS in a dual camera device, magnetic field interference between the magnets may not occur.

In addition, through the present embodiment, it is possible to reduce the size of the camera module by minimizing the gap between two closed-loop auto focus (CLAF) actuators.

BEST MODE

Figure 1:
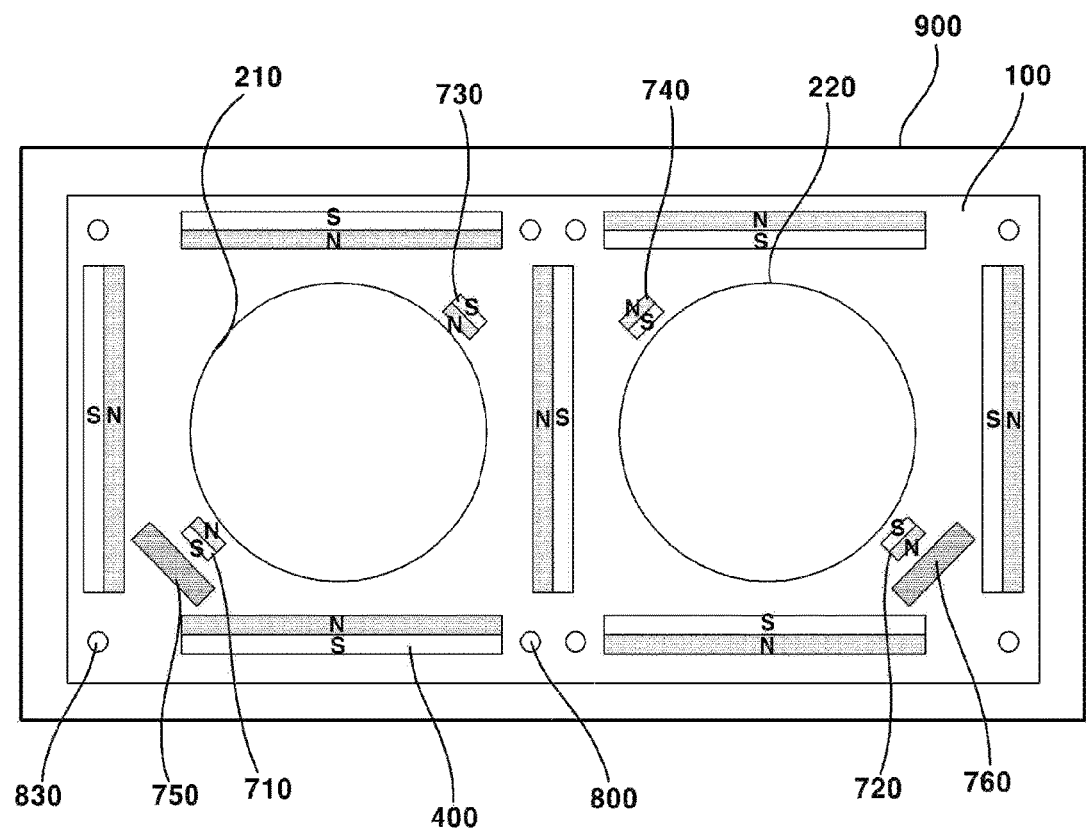
FIG. 1 is a conceptual diagram of a lens driving device according to the present embodiment.

Hereinafter, some exemplary embodiments of the present invention will be described with reference to exemplary drawings for the convenience of description. However, the technical spirit of the present invention is not limited to some exemplary embodiments.

In addition, in describing the components of the embodiment of the present invention, terms such as first, second, A, B, (a), and (b) may be used. These terms are merely intended to distinguish the components from other components, and the terms do not limit the nature, order or sequence of the components.

When a component is described as being "connected" or "coupled" to another component, the component may be directly connected or coupled to the other component, however, it should be understood that another element may be "connected" or "coupled" between components.

'Optical axis direction' used below is defined as the optical axis direction of the lens of the camera apparatus. At this time, the optical axis of the lens may correspond to the optical axis of the image sensor. Meanwhile, the 'optical axis direction' may correspond to the 'up and down' direction and the 'z axis direction.

The "auto focus function" used below is defined as the function that automatically focuses on a subject by moving the lens in the direction of the optical axis according to the distance of the subject so that clear images of the subject can be obtained on the image sensor. Meanwhile, 'auto focus' can be used interchangeably with 'Auto Focus (AF)'.

The "image stabilization function" used below is defined as a function of moving or tilting a lens module in a direction perpendicular to the optical axis direction so as to cancel a vibration (movement) generated in an image sensor by an external force. Meanwhile, "image stabilization" may be used interchangeably with "Optical Image Stabilization (OIS)".

Hereinafter, "dual camera device" and "camera device" may be used interchangeably. That is, it can be described that the camera device comprises two camera devices.

Hereinafter, the configuration of an optical apparatus according to the present embodiment will be described.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be included in the optical apparatus.

The optical apparatus may comprise a main body. The main body may form the appearance of the optical apparatus. The main body may accommodate a camera device. A display unit may be disposed on one surface of the main body. For example, the display unit and the camera device may be disposed on one surface of the main body, and another camera device may be additionally disposed on the other surface (a surface opposite to the one surface) of the main body.

The optical apparatus may comprise a display unit. The display unit may be disposed on one surface of the main body. The display unit may output an image photographed by the camera device.

The optical apparatus may comprise a camera device. The camera device may be disposed in the main body. At least a portion of the camera device may be accommodated in the main body. The camera device may be provided in plurality. The camera device may be disposed respectively on one surface of the main body and the other surface of the main body. The camera device may photograph an image of a subject.

Hereinafter, the configuration of a camera device according to the present embodiment will be described with reference to the drawings.

Figure 13:
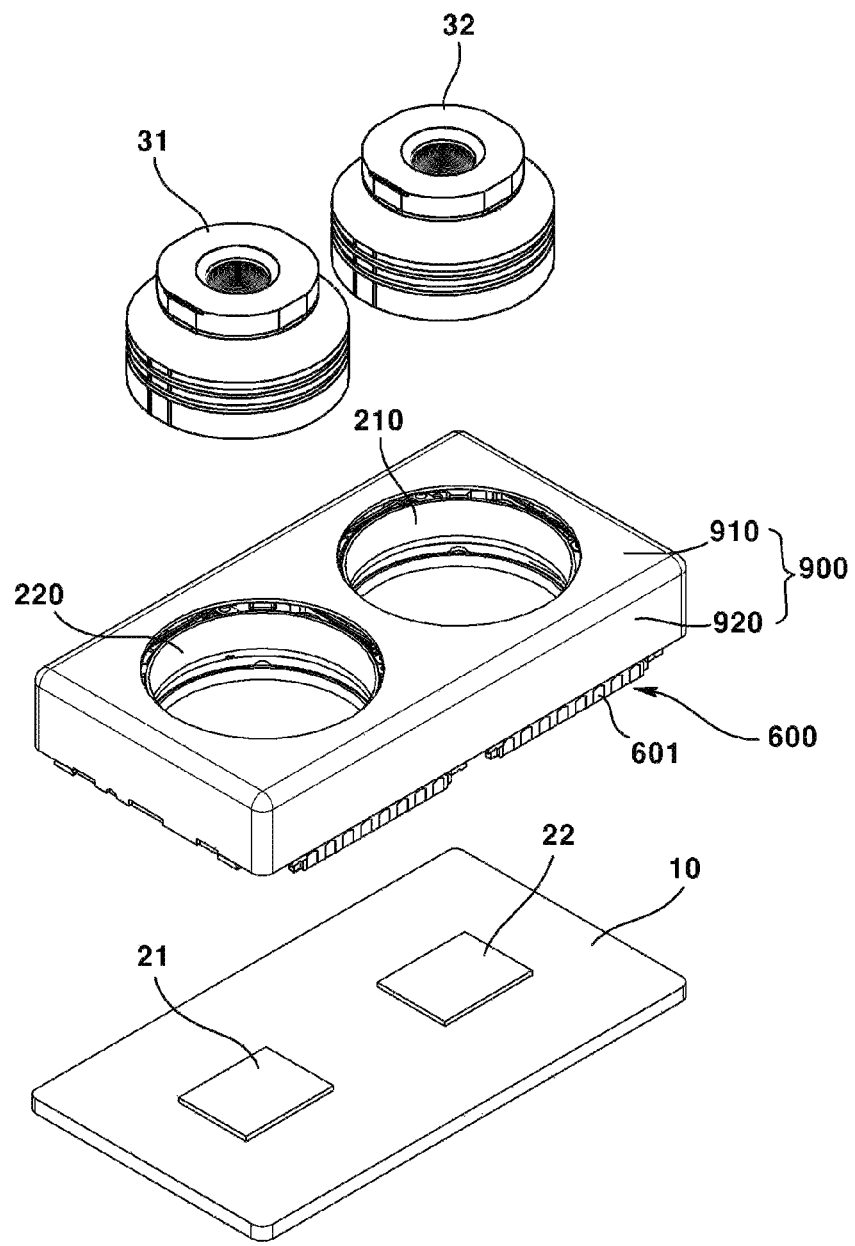
FIG. 13 is an exploded perspective view of a camera device according to the present embodiment.

FIG. 13 is an exploded perspective view of the camera device according to the present embodiment.

The camera device may comprise a plurality of camera devices. The camera device may comprise two camera devices. The camera device may be a 'dual camera device'. The camera device may be a 'camera module'.

The camera device may comprise a first lens 31 and a second lens. The first lens 31 may be coupled to a first bobbin 210. A second lens 32 may be coupled to a second bobbin 220. Each of the first lens 31 and the second lens 32 may comprise a plurality of lenses. Multiple lenses may be coupled to a barrel. A lens module in which the plurality of lenses is coupled to the barrel may be coupled to the inner circumferential surfaces of each of the first bobbin 210 and the second bobbin 220.

The camera device may comprise a first image sensor 21 and a second image sensor 22. The first image sensor 21 may be disposed under the first lens 31. The second image sensor 22 may be disposed under the second lens 32. The first image sensor 21 may be disposed on a first printed circuit board. The second image sensor 22 may be disposed on a second printed circuit board. The first image sensor 21 may be coupled to the first printed circuit board by a surface mounting technology (SMT). As another example, the first image sensor 21 may be coupled to the first printed circuit board by flip chip technology. The second image sensor 22 may be coupled to a second printed circuit board by the surface mount technology. As another example, the second image sensor 22 may be coupled to the second printed circuit board by a flip chip technology. The first image sensor 21 may be disposed such that the first lens 31 and the optical axis are coincided. The second image sensor 22 may be disposed such that the optical axis is coincided with the second lens 32. The optical axis of the first image sensor 21 and the optical axis of the first lens 31 can be aligned. The optical axis of the second image sensor 22 and the optical axis of the second lens 32 may be aligned. Each of the first image sensor 21 and the second image sensor 22 may convert light irradiated to the effective image area of the image sensor into an electrical signal. Each of the first image sensor 21 and the second image sensor 22 may be any one of a charge coupled device (CCD), a metal oxide semiconductor (MOS), a CPD, and a CID.

The camera device may comprise a first filter and a second filter. Each of the first filter and the second filter may comprise an infrared filter. The infrared filter may block light from the infrared region from entering into the first image sensor 21 and the second image sensor 22. The infrared filter may be disposed between the first lens 31 and the first image sensor 21 and between the second lens 32 and the second image sensor 22. The infrared filter may be disposed on the base 500. Alternatively, the infrared filter may be disposed on a sensor base (not shown) separate from the base 500.

The camera device may comprise a printed circuit board 10. The printed circuit board 10 may comprise a first printed circuit board and a second printed circuit board. The first printed circuit board and the second printed circuit board may be integrally formed. A base 500 or a separate sensor base may be disposed on the printed circuit board 10. The printed circuit board 10 comprises a first coil 310, a second coil 320, a third coil 620, a first Hall sensor 750, a second Hall sensor 760, and a third Hall sensor 770, and a fourth Hall sensor 780. The printed circuit board 10 may be electrically connected to the first image sensor 21 and the second image sensor 22.

The camera device may comprise a control unit. The control unit may control the direction, intensity, and amplitude of the current applied to the first coil 310, the second coil 320, and the third coil 620. The control unit may control the first Hall sensor 750, the second Hall sensor 760, the third Hall sensor 770, and the fourth Hall sensor 780. The control unit may perform AF driving, OIS driving, AF feedback control and/or OIS feedback control of the camera device.

Hereinafter, a configuration of a lens driving device according to a present embodiment and a modified embodiment will be described with reference to the drawings.

Figure 2:
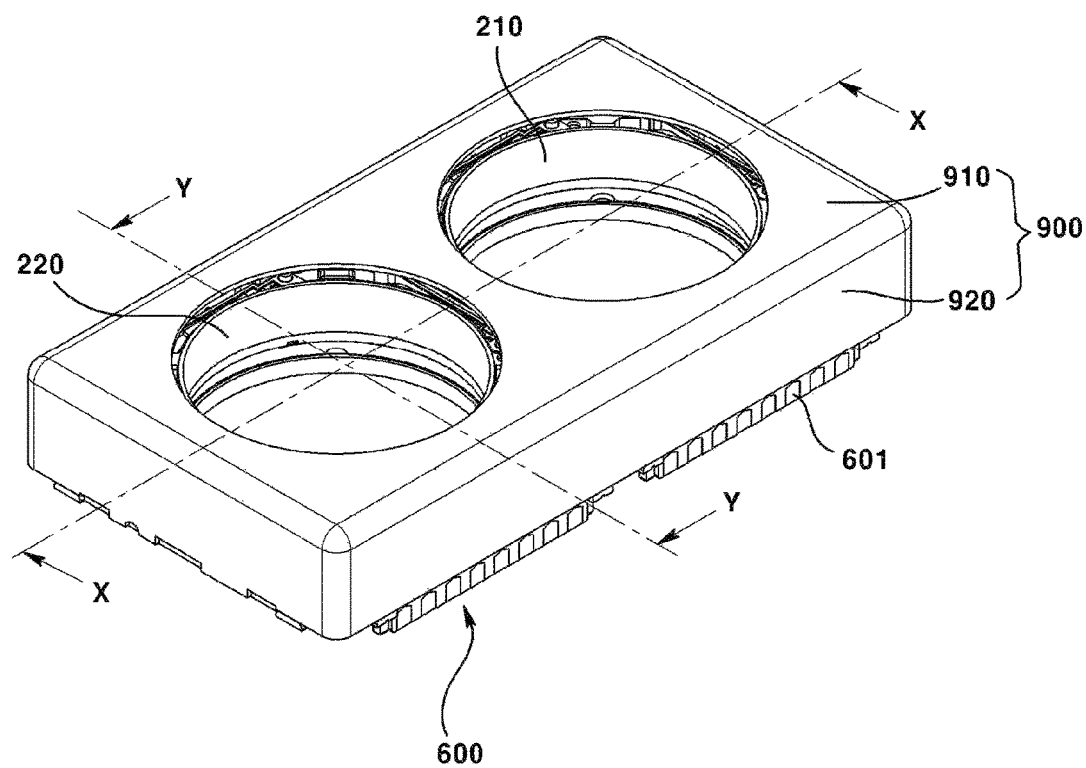
FIG. 2 is a perspective view of a lens driving device according to the present embodiment.
Figure 3:
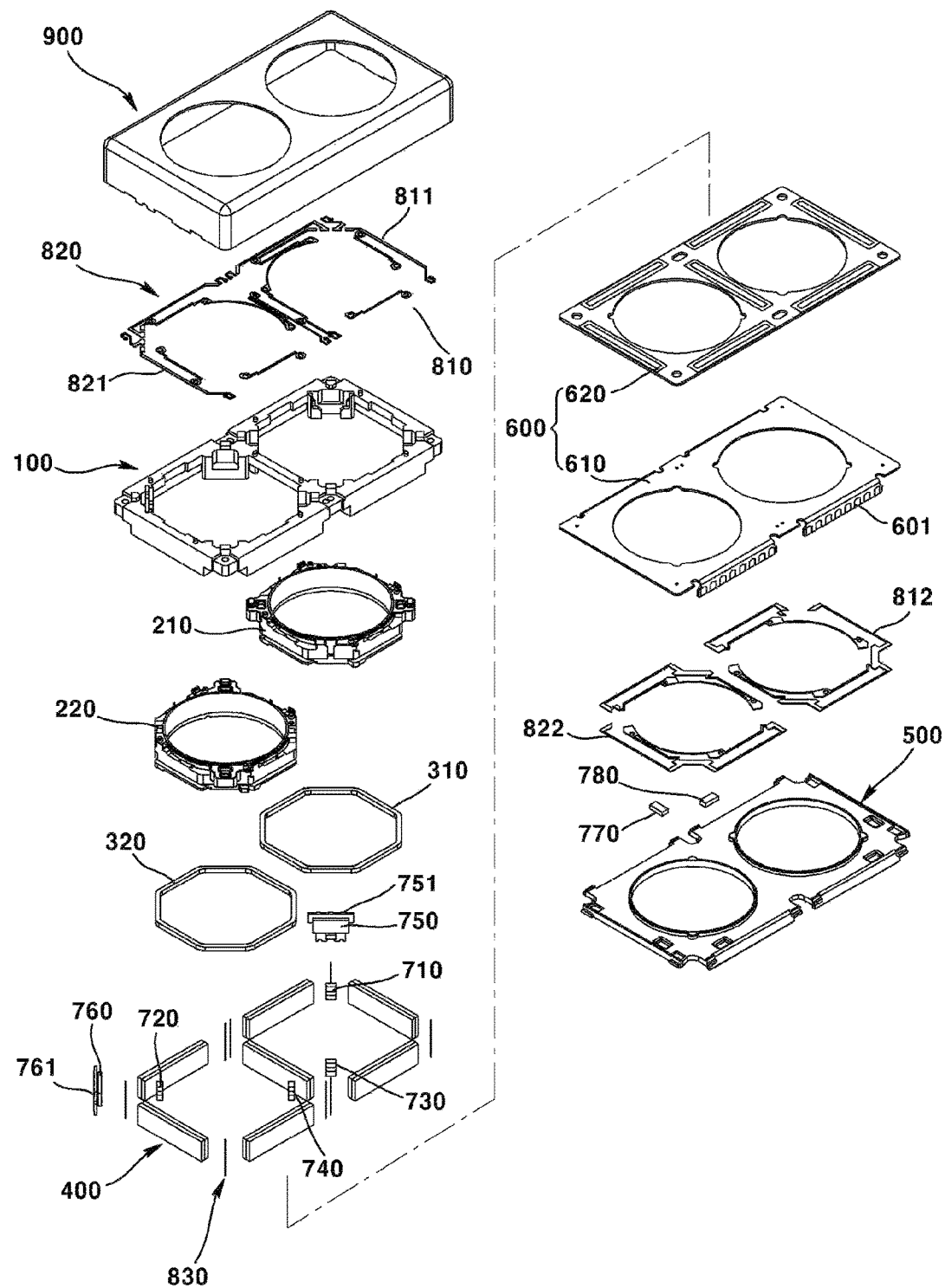
FIG. 3 is an exploded perspective view of the lens driving device according to the present embodiment.
Figure 4:
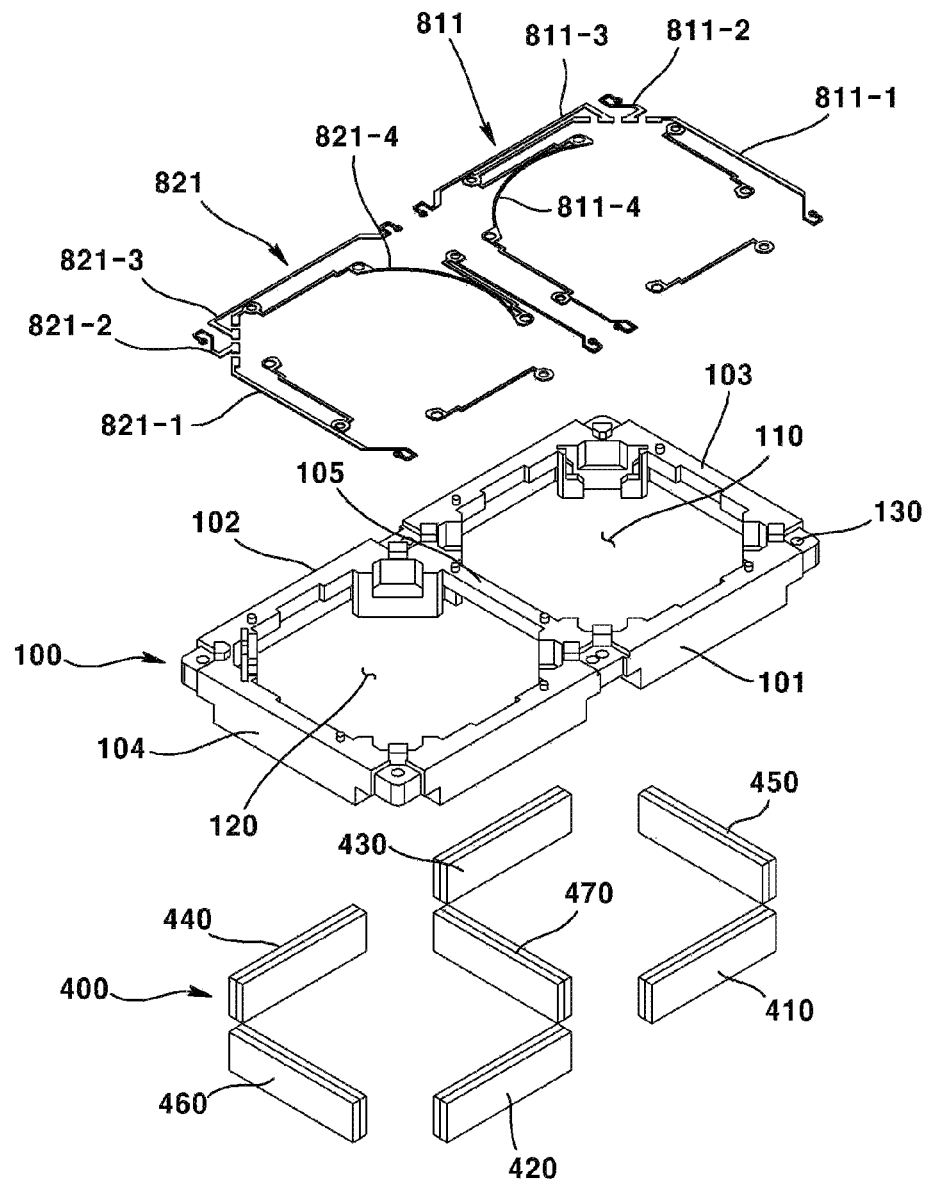
FIG. 4 and FIG. 5 are exploded perspective views of some components of the lens driving device according to the present embodiment.
Figure 5:
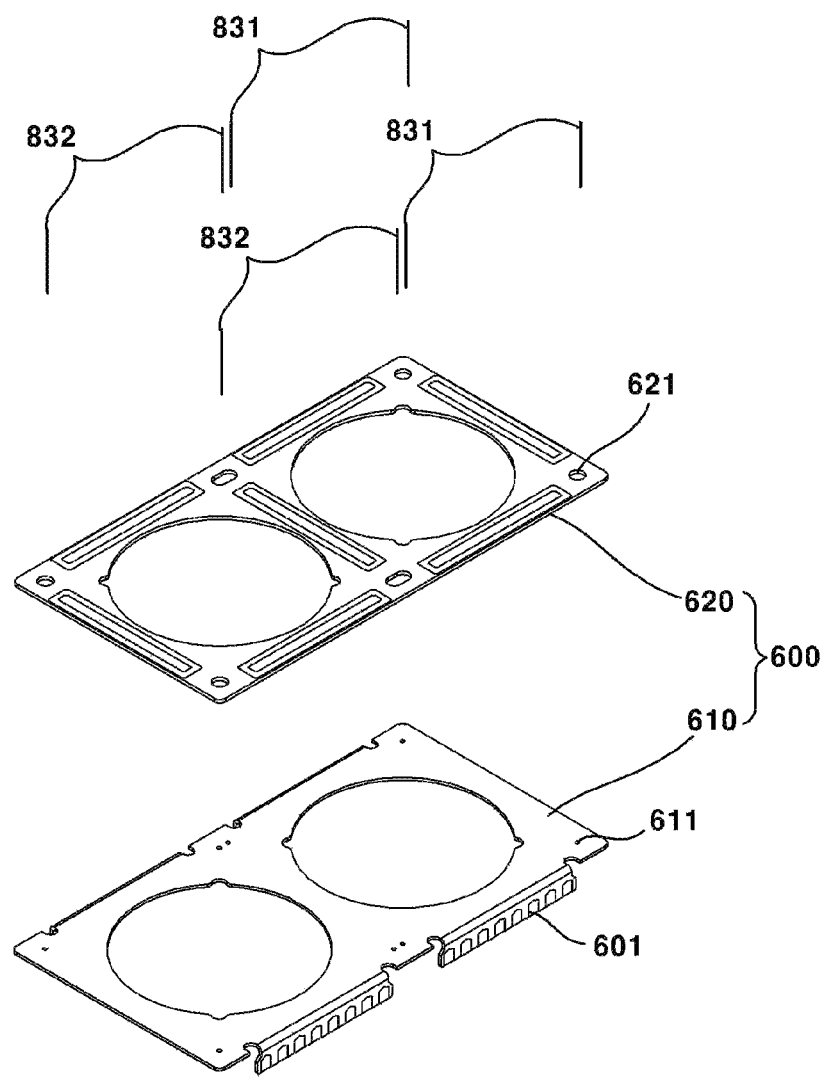
Figure 6:
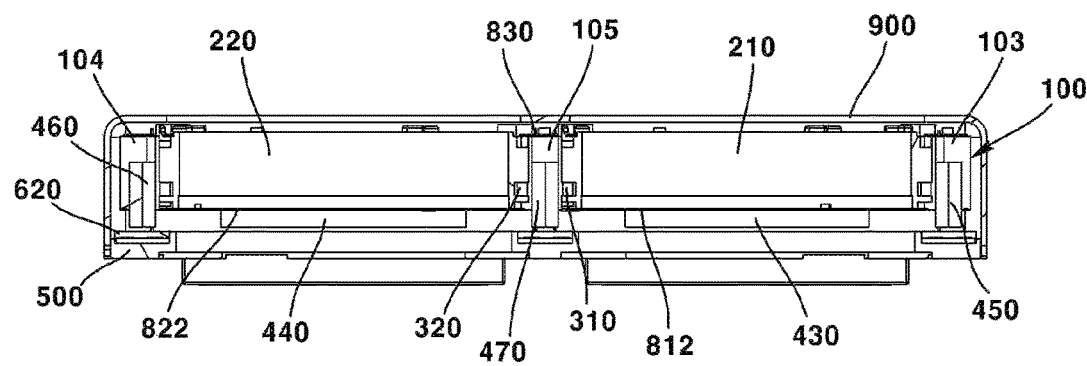
FIG. 6 is a cross-sectional view seen from X-X in FIG. 2.
Figure 7:
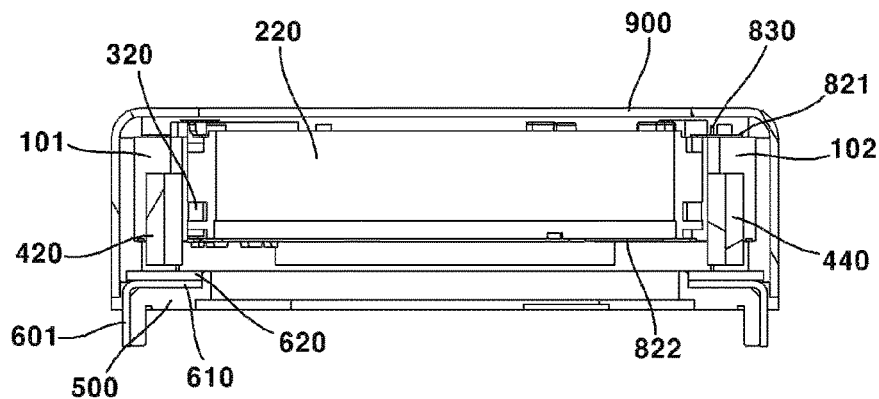
FIG. 7 is a cross-sectional view seen from Y-Y in FIG. 2.
Figure 8:
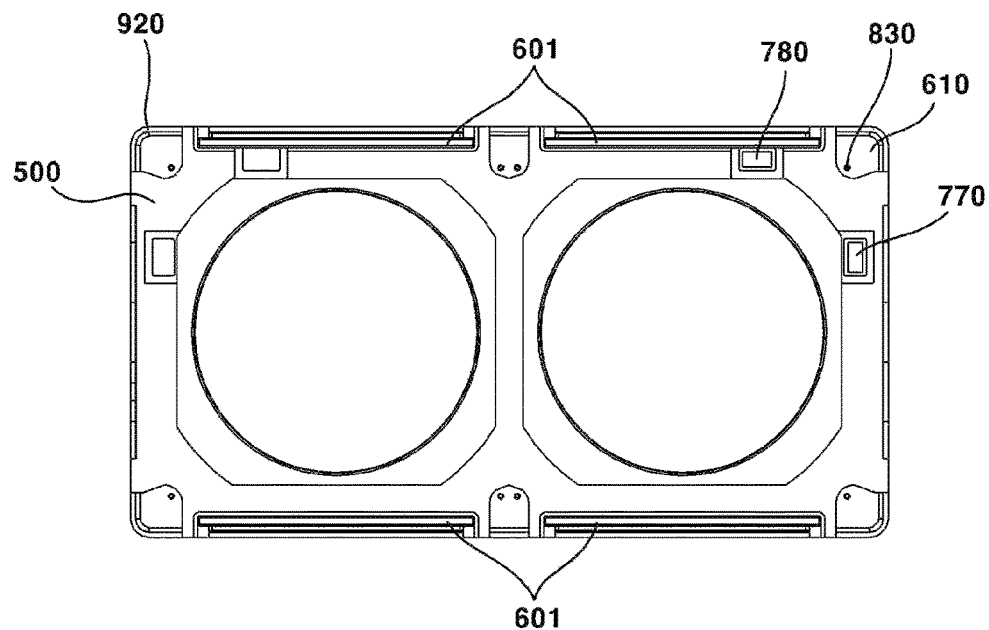
FIG. 8 is a bottom view of the lens driving device according to the present embodiment.
Figure 9:
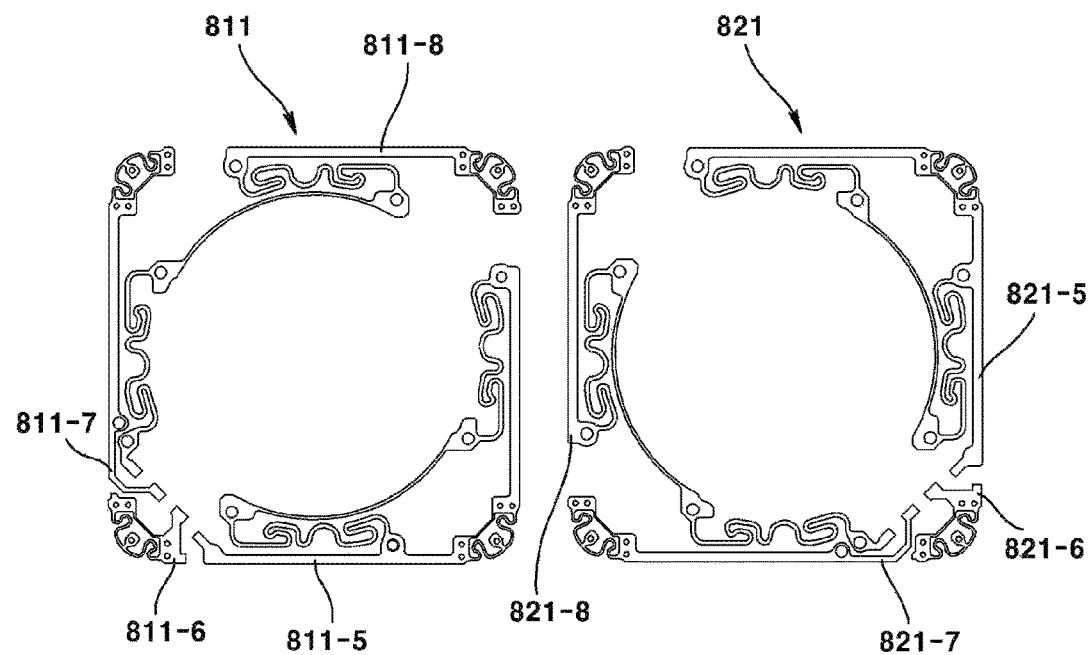
FIG. 9 is a plan view of the upper elastic member of the lens driving device according to a modified embodiment.
Figure 10:
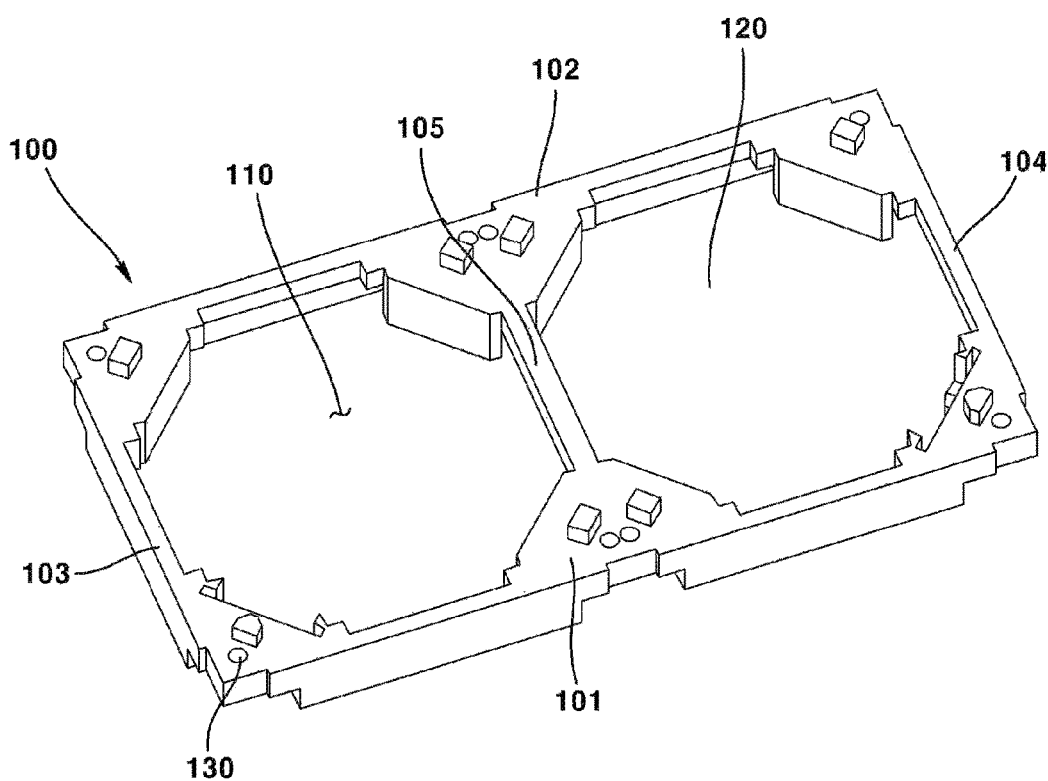
FIG. 10 is a perspective view of a housing of a lens driving device according to a modified embodiment.
Figure 11:
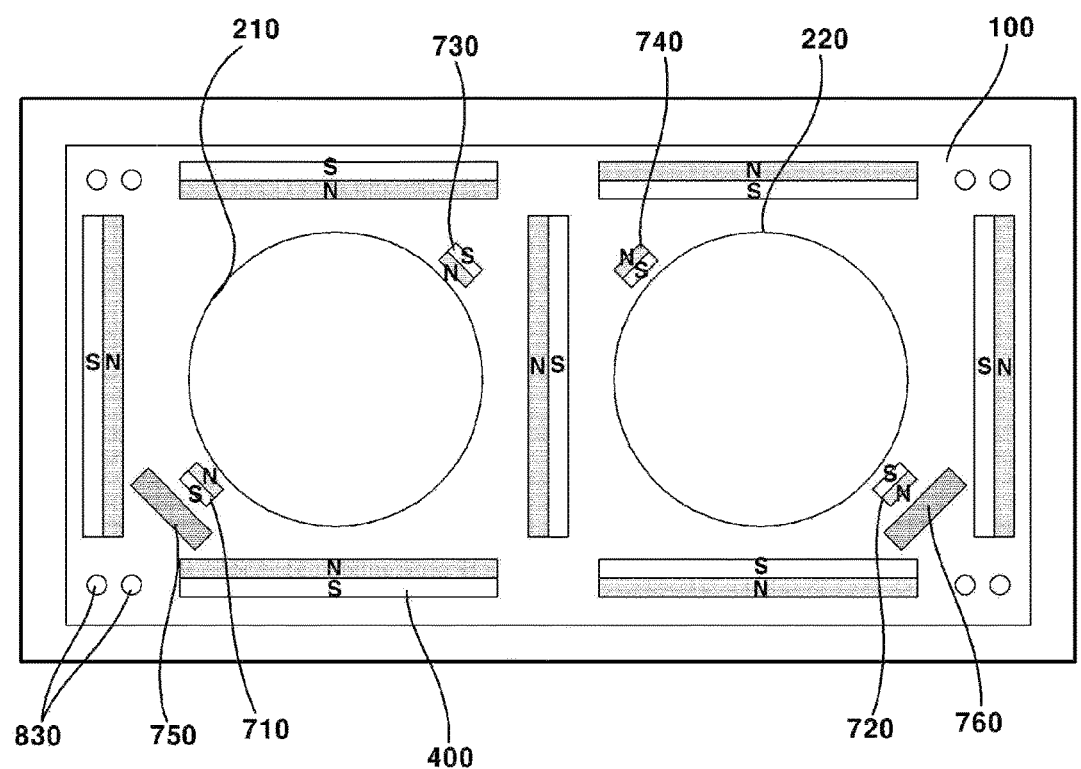
FIG. 11 is a conceptual diagram of a lens driving device according to a modified embodiment.
Figure 12:
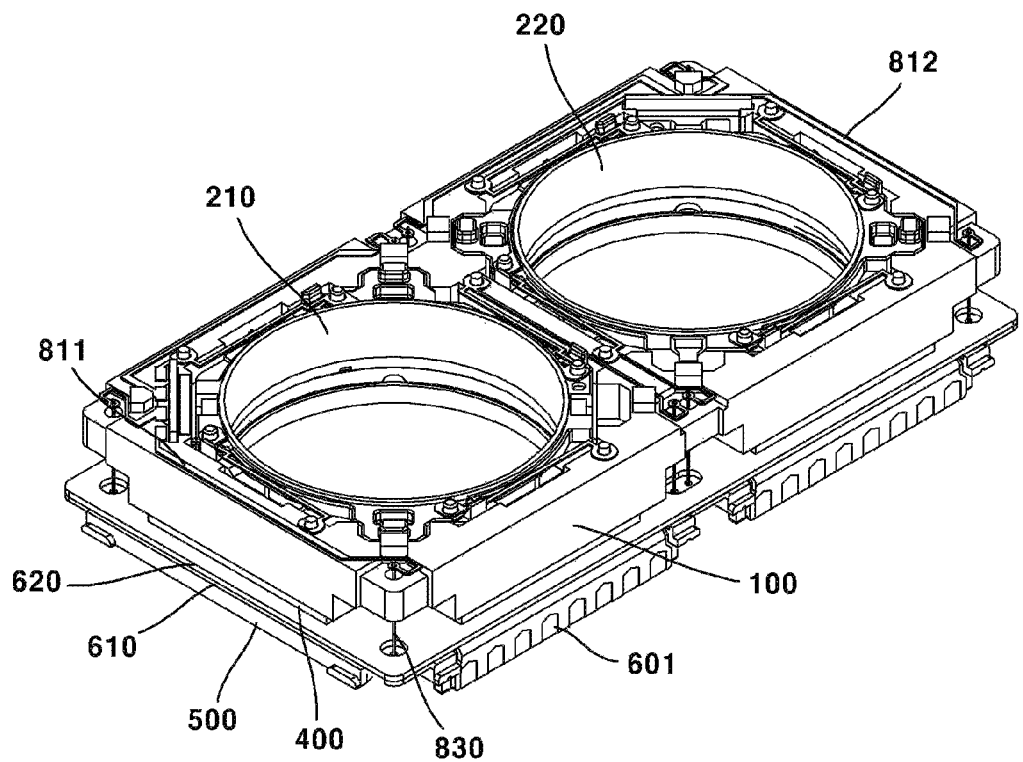
FIG. 12 is a perspective view of a state in which the cover is removed from FIG. 2.

FIG. 1 is a conceptual diagram of a lens driving device according to the present embodiment; FIG. 2 is a perspective view of a lens driving device according to the present embodiment; FIG. 3 is an exploded perspective view of the lens driving device according to the present embodiment; FIG. 4 and FIG. 5 are exploded perspective views of some components of the lens driving device according to the present embodiment; FIG. 6 is a cross-sectional view seen from X-X in FIG. 2; FIG. 7 is a cross-sectional view seen from Y-Y in FIG. 2; FIG. 8 is a bottom view of the lens driving device according to the present embodiment; FIG. 9 is a plan view of the upper elastic member of the lens driving device according to a modified embodiment; FIG. 10 is a perspective view of a housing of a lens driving device according to a modified embodiment; FIG. 11 is a conceptual diagram of a lens driving device according to a modified embodiment; and FIG. 12 is a perspective view of a state in which the cover is removed from FIG. 2.

The lens driving device may be a voice coil motor (VCM). The lens driving device may be a 'lens driving motor'. The lens driving device may comprise two closed-loop auto focus (CLAF) actuators. The lens driving device may comprise an image stabilization module (OIS module). The lens driving device may be provided in a dual camera device, and may perform AF functions and OIS functions.

The lens driving device may comprise a housing 100. The housing 100 may be disposed inside a cover 900. The housing 100 may be disposed outside a first bobbin 210 and a second bobbin 220. The housing 100 may accommodate at least a portion of the first bobbin 210 and the second bobbin 220. The housing 100 may be disposed between the first bobbin 210 and the cover 900 and between the second bobbin 220 and the cover 900. The housing 100 may be spaced apart from the first bobbin 210, the second bobbin 220, and the cover 900. The housing 100 may be formed of a material different from the cover 900. The housing 100 may be formed of an injection material. The housing 100 may be disposed on a base 500. The housing 100 can be moved for OIS driving.

The housing 100 may comprise a plurality of lateral walls. At this time, the 'lateral wall' may be a 'lateral part'. The housing 100 may comprise first to fifth lateral walls 101, 102, 103, 104, and 105. The housing 100 may comprise the first lateral wall 101 and second lateral wall 102 disposed opposite to each other, and third to fifth lateral walls 103, 104, and 105 disposed between the first lateral wall 101 and the second lateral wall 102. It can contain. At this time, the third lateral wall 103 is disposed outside the first hole 110, the fourth lateral wall 104 is disposed outside the second hole 120, and the fifth lateral wall 105 may be disposed between the first hole 110 and the second hole 120. That is, the fifth lateral wall 105 may be disposed between the first lateral wall 101 and the second lateral wall 102 and between the third lateral wall 103 and the fourth lateral wall 104.

The housing 100 may comprise a plurality of holes penetrating the housing 100 in the optical axis direction. The housing 100 may comprise a first hole 110 and a second hole 120. The first bobbin 210 may be disposed in the first hole 110 of the housing 100. The second bobbin 220 may be disposed in the second hole 120 of the housing 100. The first hole 110 and the second hole 120 may be formed in corresponding shapes and sizes.

The housing 100 may comprise a hole 130. The hole 130 may be a "wire hole" through which a wire 830 passes. The wire 830 may be disposed in the hole 130 of the housing 100. The diameter of the hole 130 of the housing 100 may be larger than the diameter of the wire 830.

The lens driving device may comprise a first bobbin 210. The first bobbin 210 may be disposed in the first hole 110 of the housing 100. The first bobbin 210 may be disposed inside the housing 100. The first bobbin 210 may be disposed inside the cover 900. The first bobbin 210 may comprise a hole penetrating the first bobbin 210 in the optical axis direction. A first lens 31 may be coupled to the hole of the first bobbin 210. The first bobbin 210 may be movably supported with respect to the housing 100 by a first elastic member 810. The first bobbin 210 may be integrally moved with the first lens 31 for AF driving and OIS driving.

The lens driving device may comprise a second bobbin 220. The second bobbin 220 may be disposed in the second hole 120 of the housing 100. The second bobbin 220 may be disposed inside the housing 100. The second bobbin 220 may be disposed inside the cover 900. The second bobbin 220 may comprise a hole penetrating the second bobbin 220 in the optical axis direction. A second lens 32 may be coupled to the hole of the second bobbin 220. The second bobbin 220 may be movably supported with respect to the housing 100 by a second elastic member 820. The second bobbin 220 may be integrally moved with the second lens 32 for AF driving and OIS driving. The second bobbin 220 may be formed in a size and shape corresponding to the first bobbin 210. The second bobbin 220 may be disposed parallel to the first bobbin 210.

The lens driving device may comprise a first coil 310. The first coil 310 may be an 'AF coil' for AF driving. The first coil 310 may be disposed on the first bobbin 210. The first coil 310 may be disposed on the outer circumferential surface of the first bobbin 210. The first coil 310 may be directly wound on the first bobbin 210. Alternatively, the first coil 310 may be coupled to the first bobbin 210 in a wound state. The first coil 310 may be disposed between the first bobbin 210 and the housing 100. The first coil 310 may face a first magnet 400. The first coil 310 may interact electromagnetically with the first magnet 400. When a current is applied to the first coil 310 and an electromagnetic field is formed around the first coil 310, the first coil 310 can move with respect to the first magnet 400 by an electromagnetic interaction between the first coil 310 and the first magnet 400.

The lens driving device may comprise a second coil 320. The second coil 320 may be an 'AF coil' for AF driving. The second coil 320 may be disposed on the second bobbin 220. The second coil 320 may be disposed on the outer circumferential surface of the second bobbin 220. The second coil 320 may be directly wound on the second bobbin 220. Or, the second coil 320 may be coupled to the second bobbin 220 in a wound state. The second coil 320 may be disposed between the second bobbin 220 and the housing 100. The second coil 320 may face the first magnet 400. The second coil 320 may interact electromagnetically with the first magnet 400. When an electric current is applied to the second coil 320 and an electromagnetic field is formed around the second coil 320, the second coil 320 can move with respect to the first magnet 400 by an electromagnetic interaction between the second coil 320 and the first magnet 400.

The lens driving device may comprise a first magnet 400. The first magnet 400 may be a 'driving magnet' for AF driving and OIS driving. The first magnet 400 may be disposed in the housing 100. The first magnet 400 may be fixed to the housing 100 by an adhesive. The first magnet 400 may be disposed between the first bobbin 210 and the housing 100 and between the second bobbin 220 and the housing 100. The first magnet 400 may face the first coil 310, the second coil 320 and/or a third coil 620. The first magnet 400 may be used in common for AF driving and OIS driving. The first magnet 400 may be a 'flat magnet' having a flat shape disposed on a lateral wall of the housing 100.

The first magnet 400 may comprise a plurality of magnets. The first magnet 400 may comprise seven magnets. At least some of the seven magnets may be formed with different widths from other magnets. Or, they may be disposed asymmetrically while having the same width. In more detail, the widths of some magnets of the first magnet 400 may be formed to be short so that magnetic force interference with a second magnet 710, a third magnet 720, and a fourth magnet 730, and a fifth magnet 740 is minimized. Or, all the magnets of the first magnet 400 have the same width, but they may be disposed to be biased toward some corners of the housing 100. The first magnet 400 may comprise 1-1 to 1-7 magnets 410, 420, 430, 440, 450, 460, and 470. The first magnet 400 may comprise: a 1-1 magnet 410 disposed on the first lateral wall 101 and facing the first coil 310; a 1-2 magnets 420 disposed on the first lateral wall 101 and facing the second coil 320; a 1-3 magnets 430 disposed on the second lateral wall 102 and facing the first coil 310; a 1-4 magnet 440 disposed on the second lateral wall 102 and facing the second coil 320; a 1-5 magnets 450 disposed on the third lateral wall 103; a 1-6 magnets 460 disposed on the fourth lateral wall 104; and a 1-7 magnet 470 placed on the fifth lateral wall 105. The 1-5 magnet 450 may face the first coil 310. The 1-6 magnet 460 may face the second coil 320. A first surface of the 1-7 magnet 470 faces the first coil 310 and a second surface of the 1-7 magnet 470 (the side disposed opposite the first surface) may face the second coil 320.

However, the magnet facing the first coil 310 may be a 'first magnet'. The magnet facing the second coil 320 may be a 'second magnet'. The magnet disposed between the first coil 310 and the second coil 320 may be a 'third magnet'. At this time, the polarity of one surface of the first magnet facing the first coil 310 may be different from the polarity of one surface of the second magnet facing the second coil 320.

In addition, the polarity of one surface of the third magnet facing the first coil 310 is the same as the polarity of one surface of the first magnet, and the polarity of the other surface of the third magnet facing the second coil 320 may be the same as the polarity of one surface of the second magnet. The N pole of the third magnet may face the first coil 310 and the S pole may face the second coil 320. Conversely, the S pole of the third magnet may face the first coil 310 and the N pole may face the second coil 320. The first magnet comprises a 1-1 magnet disposed on the first lateral wall 101, a 1-2 magnet disposed on the second lateral wall 102, and a 1-3 magnet disposed on the third lateral wall 103; the second magnet comprises a 2-1 magnet disposed on the first lateral wall 101, a 2-2 magnet disposed on the second lateral wall 102, and a 2-3 magnet disposed on the fourth lateral wall 104; and the third magnet can be placed on the fifth lateral wall 105.

In the present embodiment, the inner surface of the 1-1 magnet 410, the inner surface of the 1-3 magnet 430, the inner surface of the 1-5 magnet 450, and the first surface of the 1-7 magnet 470 have the same polarity and may face the first coil 310. The inner surface of the 1-2 magnet 420, the inner surface of the 1-4 magnet 440, the inner surface of the 1-6 magnet 460, and the second surface of the 1-7 magnet 470 (the surface opposite to the first surface) have the same polarity and may face the second coil 320. At this time, the first surface of the 1-7 magnet 470 and the second surface of the 1-7 magnet 470 are disposed opposite to each other and may have different polarities. Magnetic interference between the magnets can be minimized through such polarity arrangement of the magnets.

The lens driving device may comprise a base 500. The base 500 may be spaced apart from the housing 100. The base 500 may be disposed under the housing 100. The base 500 may be coupled with a side plate 920 of the cover 900. The base 500 may be disposed on a printed circuit board 10. The base 500 may comprise two holes penetrating the base 500 in the optical axis direction and through which light passes. The base 500 may comprise a hole or groove accommodating a third Hall sensor 770 and a fourth Hall sensor 780.

The lens driving device may comprise a substrate 600. The substrate 600 may be disposed on the base 500. The substrate 600 may be disposed on the upper surface of the base 500. The substrate 600 may be a flexible printed circuit board (FPCB). The substrate 600 may be combined with a wire 830. The substrate 600 may be disposed between the housing 100 and the base 500. The substrate 600 may be electrically connected to the first coil 310, the second coil 320 and/or the third coil 620. The substrate 600 may be electrically connected to a first Hall sensor 750, a second Hall sensor 760, a third Hall sensor 770 and/or a fourth Hall sensor 780.

The substrate 600 may comprise a terminal 601. The substrate 600 may comprise a substrate portion 610. The substrate 600 may comprise a terminal portion extending downward from the outer circumference of the substrate portion 610. At this time, a plurality of terminals 601 may be formed on the outer surface of the terminal portion. The substrate portion 610 may comprise a hole 611. The wire 830 may pass through the hole 611 of the substrate portion 610. The diameter of the hole 611 of the substrate portion 610 may correspond to the diameter of the wire 830. The number of holes 611 of the substrate portion 610 may correspond to the number of wires 830.

The lens driving device may comprise a third coil 620. The third coil 620 may be an 'OIS coil' for driving OIS. The substrate 600 may comprise a third coil 620. The third coil 620 may be disposed on the substrate 600 in the form of a pattern coil. The third coil 620 may be a 'fine-pattern (FP) coil'. However, the third coil 620 may be a separate configuration from the substrate 600. The third coil 620 may be disposed on the base 500. The third coil 620 may be disposed on the substrate portion 610. The third coil 620 may face the first magnet 400. The third coil 620 may comprise a hole 621. The wire 830 may pass through the hole 621 of the third coil 620. The third coil 620 may comprise a 3-1 coil for moving the first magnet 400 in a first direction, and a 3-2 coil for moving the first magnet 400 in a second direction perpendicular to the first direction. At this time, the 3-1 coil may comprise a plurality of coils, and the plurality of coils may be integrally formed. Or, a plurality of coils of the 3-1 coil may be formed separately. In addition, the 3-2 coil may comprise a plurality of coils, and the plurality of coils may be integrally formed. Alternatively, a plurality of coils of the 3-2 coil may be formed separately.

The lens driving device may comprise a second magnet 710. The second magnet 710 may be a "sensing magnet" for AF feedback control. The second magnet 710 may be disposed on the first bobbin 210. The second magnet 710 may be disposed to correspond to the first Hall sensor 750. The second magnet 710 may be disposed to face a corner formed between the lateral walls disposed adjacently in the housing 100. The second magnet 710 may face a corner portion between the second lateral wall 102 and the third lateral wall 103 of the housing 100. Alternatively, the second magnet 710 may face a corner portion between the first lateral wall 101 and the third lateral wall 103 of the housing 100. The second magnet 710, the outer surface of the second magnet 710, may have a different polarity from the inner surface of the 1-1 magnet 410. That is, the inner surface of the second magnet 710 may have the same polarity as the inner surface of the 1-1 magnet 410.

The lens driving device may comprise a third magnet 720. The third magnet 720 may be a 'sensing magnet' for AF feedback control. The third magnet 720 may be disposed on the second bobbin 220. The third magnet 720 may be disposed to correspond to the second Hall sensor 760. The third magnet 720 may be disposed to face a corner formed between the lateral walls disposed adjacently in the housing 100. The third magnet 720 may face the corner portion between the second lateral wall 102 and the fourth lateral wall 104 of the housing 100. Or, the third magnet 720 may face a corner portion between the first lateral wall 101 and the fourth lateral wall 104 of the housing 100. The outer surface of the third magnet 720 may have a different polarity from the inner surface of the 1-2 magnet 420. That is, the inner surface of the third magnet 720 may have the same polarity as the inner surface of the 1-2 magnet 420.

The lens driving device may comprise a fourth magnet 730. The fourth magnet 730 may be a 'compensation magnet' for compensating the magnetic force of the second magnet 710. The fourth magnet 730 may be disposed on the first bobbin 210. The fourth magnet 730 may be disposed on the opposite side of the second magnet 710 with respect to the central axis of the first bobbin 210. At this time, the central axis of the first bobbin 210 may correspond to the optical axis of the first lens 31. The fourth magnet 730 may face a portion between the first lateral wall 101 and the fifth lateral wall 105 of the housing 100. The outer surface of the fourth magnet 730 may have a different polarity from the inner surface of the 1-1 magnet 410. That is, the inner surface of the fourth magnet 730 may have the same polarity as the inner surface of the 1-1 magnet 410.

The lens driving device may comprise a fifth magnet 740. The fifth magnet 740 may be a 'compensation magnet' for compensating the magnetic force of the third magnet 720. The fifth magnet 740 may be disposed on the second bobbin 220. The fifth magnet 740 may be disposed on the opposite side of the third magnet 720 with respect to the central axis of the second bobbin 220. At this time, the central axis of the second bobbin 220 may correspond to the optical axis of the second lens 32. The fifth magnet 740 may face a portion between the first lateral wall 101 and the fifth lateral wall 105 of the housing 100. The outer surface of the fifth magnet 740 may have a different polarity from the inner surface of the 1-2 magnet 420. That is, the inner surface of the fifth magnet 740 may have the same polarity as the inner surface of the 1-2 magnet 420.

The lens driving device may comprise a first Hall sensor 750. The first hall sensor 750 may be an 'AF sensor' for AF feedback control. The Hall sensor may be a 'Hall IC'. The first Hall sensor 750 may be disposed inside the housing 100. The first Hall sensor 750 may face the second magnet 710. The first Hall sensor 750 may detect the second magnet 710. The first Hall sensor 750 may sense the magnetic force of the second magnet 710. The lens driving device may comprise a substrate 751 disposed on the housing 100. The first Hall sensor 750 may be disposed on the substrate 751. The first Hall sensor 750 may be disposed at a corner portion formed between the lateral walls disposed adjacently in the housing 100. The first Hall sensor 750 and the substrate 751 may be disposed at a corner portion between the second lateral wall 102 and the third lateral wall 103 of the housing 100. Or, the first Hall sensor 750 and the substrate 751 may be disposed at a corner portion between the first lateral wall 101 and the third lateral wall 103 of the housing 100. The substrate 751 may be electrically connected to a first upper elastic member 811. The first Hall sensor 750 may be electrically connected with the substrate 751.

The lens driving device may comprise a second Hall sensor 760. The second Hall sensor 760 may be an 'AF sensor' for AF feedback control. The second Hall sensor 760 may be disposed inside the housing 100. The second Hall sensor 760 may face the third magnet 720. The second Hall sensor 760 may detect the third magnet 720. The second Hall sensor 760 may sense the magnetic force of the third magnet 720. The lens driving device may comprise a substrate 761 disposed on the housing 100. The second Hall sensor 760 may be disposed on the substrate 761. The second Hall sensor 760 may be disposed in a corner portion formed between the lateral walls disposed adjacently in the housing 100. The second Hall sensor 760 and the substrate 761 may be disposed at a corner portion between the second lateral wall 102 and the fourth lateral wall 104 of the housing 100. Or, the second Hall sensor 760 and the substrate 761 may be disposed at a corner portion between the first lateral wall 101 and the fourth lateral wall 104 of the housing 100. The substrate 761 may be electrically connected to a second upper elastic member 821. The second Hall sensor 760 may be electrically connected to the substrate 761.

Each of the first Hall sensor 750 and the second Hall sensor 760 may be a driver IC integrated structure. That is, the first Hall sensor 750 and the second Hall sensor 760 may individually perform a closed-loop auto focus (CLAF) driving. Each of the first Hall sensor 750 and the second Hall sensor 760 may comprise a plurality of signal lines for CLAF driving. Each of the first Hall sensor 750 and the second Hall sensor 760 may comprise four terminals, SCL, SDA, VDD, and GND.

In the present embodiment, both the first bobbin 210 and the second bobbin 220 have been described as CLAF-capable, but in a modified embodiment, only one of the first bobbin 210 and the second bobbin 220 may be CLAF-capable. That is, the second magnet 710 and the first Hall sensor 750 may be omitted, or the third magnet 720 and the second Hall sensor 760 may be omitted. In this case, two of the eight wires may be omitted. For an example, in the embodiment in which the third magnet 720 and the second Hall sensor 760 are omitted, four of the six wires are electrically connected to the first Hall sensor 750 integrated with the driver IC so that the first bobbin 210 is used for CLAF control, and the other two wires are electrically connected to the second coil 320 to be used for AF control. Or, 8 wires are maintained as they are, and 4 of the 8 wires are electrically connected to the first Hall sensor 750 that is not integrated with the driver IC, the other two wires are electrically connected to the first coil 310, and the remaining two wires may be electrically connected to the second coil 320.

The lens driving device may comprise a third Hall sensor 770. The third Hall sensor 770 may be an 'OIS sensor' for OIS feedback control. The third Hall sensor 770 may face the first magnet 400. The third Hall sensor 770 may detect movement of the first magnet 400 in a first direction. At this time, the first direction may be the x-axis direction. The third Hall sensor 770 may be disposed under the 1-6 magnet 460.

The lens driving device may comprise a fourth Hall sensor 780. The fourth Hall sensor 780 may be an 'OIS sensor' for OIS feedback control. The fourth Hall sensor 780 may face the first magnet 400. The fourth Hall sensor 780 may detect movement of the first magnet 400 in a second direction perpendicular to the first direction. At this time, the second direction may be the y-axis direction. The fourth Hall sensor 780 may be disposed under the 1-2 magnet 420.

The lens driving device may comprise a first elastic member 810. The first elastic member 810 may connect the first bobbin 210 and the housing 100. The first elastic member 810 may movably support the first bobbin 210 with respect to the housing 100. The first elastic member 810 may elastically support the first bobbin 210. The first elastic member 810 may have elasticity at least in part.

The first elastic member 810 may comprise a plurality of elastic members. The first elastic member 810 may comprise a plurality of elastic units. In addition, the first elastic member 810 may comprise a plurality of units. At least some of the plurality of units of the first elastic member 810 may not have elasticity. The first elastic member 810 may comprise four elastic units.

The first elastic member 810 may comprise a first upper elastic member 811. The first upper elastic member 811 may be connected to the upper portion of the first bobbin 210 and the upper portion of the housing 100. The first upper elastic member 811 may be coupled to the upper surface of the first bobbin 210 and the upper surface of the housing 100. The first upper elastic member 811 may comprise an inner side portion coupled with an upper portion of the first bobbin 210, an outer side portion coupled with an upper portion of the housing 100, and a connecting portion connecting the inner side portion and the outer side portion.

The first upper elastic member 811 may comprise four elastic units. The first upper elastic member 811 may comprise first to fourth elastic units 811-1, 811-2, 811-3, and 811-4 (refer to FIG. 4). In the present embodiment, the first upper elastic member 811 may comprise additional elastic units in addition to the first to fourth elastic units 811-1, 811-2, 811-3, and 811-4. The first upper elastic member 811 may comprise a total of six elastic units. At this time, four of the six elastic units may be used as conductive lines.

In a modified embodiment, the first upper elastic member 811 may comprise first to fourth elastic units 811-5, 811-6, 811-7, and 811-8 (refer to FIG. 9). In the modified embodiment, the first upper elastic member 811 comprises a total of four elastic units, and all four elastic units can be used as conductive lines.

The first elastic member 810 may comprise a first lower elastic member 812. The first lower elastic member 812 may connect the lower portion of the first bobbin 210 and the lower portion of the housing 100. The first lower elastic member 812 may be coupled to the lower surface of the first bobbin 210 and the lower surface of the housing 100. The first lower elastic member 812 may comprise an inner side portion coupled with a lower portion of the first bobbin 210, an outer side portion coupled with a lower portion of the housing 100, and a connecting portion connecting the inner side portion and the outer side portion.

The lens driving device may comprise a second elastic member 820. The second elastic member 820 may connect the second bobbin 220 and the housing 100. The second elastic member 820 may movably support the second bobbin 220 with respect to the housing 100. The second elastic member 820 may elastically support the second bobbin 220. The second elastic member 820 may have elasticity at least in part.

The second elastic member 820 may comprise a plurality of elastic members. The second elastic member 820 may comprise a plurality of elastic units. The second elastic member 820 may comprise four elastic units.

The second elastic member 820 may comprise a second upper elastic member 821. The second upper elastic member 821 may be connected to the upper portion of the second bobbin 220 and the upper portion of the housing 100. The second upper elastic member 821 may be coupled to the upper surface of the second bobbin 220 and the upper surface of the housing 100. The second upper elastic member 821 may comprise an inner side portion coupled with the upper portion of the second bobbin 220, an outer side portion coupled with the upper portion of the housing 100, and a connecting portion connecting the inner side portion and the outer side portion.

The second upper elastic member 821 may comprise four elastic units. The second upper elastic member 821 may comprise fifth to eighth elastic units 821-1, 821-2, 821-3, and 821-4 (refer to FIG. 4). In the present embodiment, the second upper elastic member 821 may comprise additional elastic units in addition to the fifth to eighth elastic units 821-1, 821-2, 821-3, and 821-4. The second upper elastic member 821 may comprise a total of six elastic units. At this time, four of the six elastic units may be used as conductive lines.

In a modified embodiment, the second upper elastic member 821 may comprise fifth to eighth elastic units 821-5, 821-6, 821-7, and 821-8 (refer to FIG. 9). In the modified example, the second upper elastic member 821 comprises a total of four elastic units, and all four elastic units may be used as conductive lines.

The second elastic member 820 may comprise a second lower elastic member 822. The second lower elastic member 822 may connect the lower portion of the second bobbin 220 and the lower portion of the housing 100. The second lower elastic member 822 may be coupled to the lower surface of the second bobbin 220 and the lower surface of the housing 100. The second lower elastic member 822 may comprise an inner side portion coupled to the lower portion of the second bobbin 220, an outer side portion coupled to the lower portion of the housing 100, and a connecting portion connecting the inner side portion and the outer side portion.

The lens driving device may comprise a support member. The support member may comprise a wire 830 and/or a plate spring. The support member may movably support the housing 100 with respect to the base 500 and/or the substrate 600. The support member may be an 'elastic member'. The support member may have elasticity at least in part.

The wire 830 may be connected to the first upper elastic member 811 and the substrate 600 and the second upper elastic member 821 and the substrate 600. The upper end portion of the wire 830 may be coupled to the first upper elastic member 811 or the second upper elastic member 821 by soldering. The lower end portion of the wire 830 may be coupled to the lower surface of the substrate 600 by soldering. The wire 830 may pass through a hole 130 of the housing 100, a hole 621 of the third coil 620, and a hole 611 of a substrate portion 610. The wire 830 is conductive and can be used as a conductive line. The wire 830 may comprise a plurality of wires. The wire 830 may comprise a total of 8 wires.

The wire 830 may comprise a first wire 831. The first wire 831 may connect the first elastic member 810 and the substrate 600. The first wire 831 may comprise four wires spaced apart from each other. At this time, the four wires may be respectively coupled to the four elastic units of the first upper elastic member 811. The lower end portion of the four wires may be coupled to the substrate 600, the upper end portion of the four wires may be coupled to the four elastic units, and the four elastic units may be coupled to a substrate 751 of a first Hall sensor 750. Through this, the first upper elastic member 811 and the first wire 831 may be used as four conductive lines between the substrate 600 and the substrate 751 of the first Hall sensor 750.

The wire 830 may comprise a second wire 832. The second wire 832 may connect the second elastic member 820 and the substrate 600. The second wire 832 may comprise four wires spaced apart from each other. At this time, the four wires may be respectively coupled to the four elastic units of the second upper elastic member 821. The lower end portions of the four wires are coupled to the substrate 600, the upper end portions of the four wires are coupled to the four elastic units, and the four elastic units can be coupled to a substrate 761 of a second Hall sensor 760. Through this, the second upper elastic member 821 and the second wire 832 may be used as four conductive lines between the substrate 600 and the substrate 761 of the second Hall sensor 760.

In the present embodiment, the first elastic member 810 and the first wire 831 may electrically connect the first Hall sensor 750 and the substrate 600. The second elastic member 820 and the second wire 832 may electrically connect the second Hall sensor 760 and the substrate 600.

The first wire 831 and the second wire 832 may comprise a total of 8 wires, 4 each. In the present embodiment, 4 of the 8 wires are respectively disposed at 4 corners of the housing 100, and the remaining 4 wires may be disposed two each between the 1-1 magnet 410 and the 1-2 magnet 420, and two each between the 1-3 magnet 430 and the 1-4 magnet 440. In the modified embodiment, 8 wires may be disposed two at each of the four corner portions of the housing 100 (refer to FIG. 11).

The lens driving device may comprise a cover 900. The cover 900 may be coupled with the base 500. The cover 900 can accommodate the housing 100 therein. The cover 900 may form an external appearance of the lens driving device.

The cover 900 may be in the shape of a cuboid with a lower surface open. The cover 900 may be non-magnetic. The cover 900 may be formed of a metal material. The cover 900 may be formed of a metal sheet material. The cover 900 may be connected to the ground portion of the printed circuit board 10. Through this, the cover 900 may be grounded. The cover 900 may block the electromagnetic interference (EMI). At this time, the cover 900 may be an 'EMI shield can'.

The cover 900 may comprise an upper plate 910 and a side plate 920. The cover 900 may comprise an upper plate 910 comprising holes and a plurality of side plates 920 extending downward from an outer periphery or edge of the upper plate 910. The lower end of the side plate 920 may be disposed on a step portion formed on the side surface of the base 500. The inner surface of the side plate 920 may be coupled with the base 500 by an adhesive. The side plate 920 may comprise a plurality of side plates. The side plate 920 may comprise four side plates. The side plate 920 may comprise first to fourth side plates.

The camera device according to the present embodiment can be manufactured in the following process sequence. A first bobbin assembly coupled with a first bobbin 210, a first coil 310, a second magnet 710, and a fourth magnet 730; and a bobbin assembly comprising a second bobbin assembly coupled with a second bobbin 220, a second coil 320, a third magnet 720, and a fifth magnet 740 may be prepared. In addition, a housing magnet assembly coupled with a housing 100, a first magnet 400, a first Hall sensor 750, and a second Hall sensor 760 may be prepared. Thereafter, the bobbin assembly and the housing magnet assembly may be assembled into an AF assembly (Dual) through a first elastic member 810 and a second elastic member 820. Meanwhile, a base assembly coupled with a base 500, a substrate 600, a third coil 620, a third Hall sensor 770, and a fourth Hall sensor 780 may be prepared. Thereafter, the AF assembly and the base assembly may be assembled into an OIS main assembly through a wire 830.

The present embodiment may comprise a dual closed loop auto focus (DUAL CLAF) integrated housing 100 (refer to FIG. 10). According to the present embodiment, since the gap between the AF actuators in the OIS dual camera equipped with CLAF can be reduced to zero, the camera device size can be reduced. According to the present embodiment, the driver IC integrated CLAF can be installed in dual, and magnet interference may not occur when driving the OIS. In the present embodiment, two through holes through which light passes may be formed in one base 500. In the present embodiment, the dual voice coil motor (VCM) can be operated simultaneously when the OIS is driven. At this time, only one Hall IC for checking the OIS position may be required for each of the x-axis and y-axis.

In the present embodiment, the polarity directions of the driving magnet and the sensing magnet may be arranged differently in the left and right VCM. On the other hand, the direction of rotation of the FP coil may correspond to the direction of magnet polarity arrangement.

In the above description, all components constituting the embodiments of the present invention are described as being combined or operating in combination, but the present invention is not necessarily limited to the embodiments. In other words, within the scope of the purpose of this invention, all of those components may operate in selective combinations of one or more components. In addition, the term "include", "comprise", or "have" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of an example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A lens driving device comprising:
a housing comprising a first hole and a second hole;
a first bobbin disposed in the first hole of the housing;
a second bobbin disposed in the second hole of the housing;
a first coil disposed on the first bobbin;
a second coil disposed on the second bobbin;
a driving magnet disposed on the housing and facing the first coil, a second magnet facing the second coil, and a third magnet disposed between the first coil and the second coil;
a first sensing magnet disposed on the first bobbin; and
a second sensing magnet disposed on the second bobbin,
wherein the housing comprises first and second lateral surfaces opposite to each other, third and fourth lateral surfaces opposite to each other, a first corner formed by the first and third lateral surfaces, a second corner formed by the second and third lateral surfaces, a third corner formed by the second and fourth lateral surfaces, and a fourth corner formed by the first and fourth lateral surfaces,
wherein the first sensing magnet is disposed at a position corresponding to the first corner of the housing, and
wherein the second sensing magnet is disposed at a position corresponding to the fourth corner of the housing.

2. A camera device comprising:
a printed circuit board;
first and second image sensors disposed on the printed circuit board;
the lens driving device of claim 1 disposed above the printed circuit board;
a first lens coupled to the first bobbin and disposed at a position corresponding to that of the first image sensor; and
a second lens coupled to the second bobbin and disposed at a position corresponding to that of the second image sensor.

3. An optical apparatus comprising:
a main body;
the camera device of claim 2 disposed on the main body; and a display disposed on the main body and outputting an image captured by the camera device.

4. The lens driving device of claim 1, comprising:
a first substrate disposed on the first corner of the housing;
a second substrate disposed on the fourth corner of the housing;
a first Hall sensor disposed on the first substrate and configured to sense the first sensing magnet; and
a second Hall sensor disposed on the second substrate and configured to sense the second sensing magnet.

5. The lens driving device of claim 4, comprising:
a first upper elastic member connecting the first bobbin and the housing and comprising four first upper elastic units; and
a second upper elastic member connecting the second bobbin and the housing and comprising four second upper elastic units,
wherein the four first upper elastic units are electrically connected to the first substrate, and
wherein the four second upper elastic units are electrically connected to the second substrate.

6. The lens driving device of claim 5, comprising:
a base disposed below the housing;
a third substrate disposed on the base; and
a third coil disposed on the third substrate and disposed at a position corresponding to the driving magnet.

7. The lens driving device of claim 6, comprising:
a first wire connecting the first upper elastic member and the third substrate;
a second wire connecting the second upper elastic member and the third substrate;
wherein the first wire comprises four first wires electrically connected to the four first upper elastic units, respectively, and
wherein the second wire comprises four second wires electrically connected to the four second upper elastic units, respectively.

8. The lens driving device of claim 6, wherein the driving magnet comprises a first magnet facing the first coil, a second magnet facing the second coil, and a third magnet disposed between the first coil and the second coil.

9. The lens driving device of claim 8, wherein a polarity of one surface of the first magnet facing the first coil is different from a polarity of one surface of the second magnet facing the second coil.

10. The lens driving device of claim 9, wherein a polarity of one surface of the third magnet facing the first coil is the same as the polarity of the one surface of the first magnet, and
wherein a polarity of the other surface of the third magnet facing the second coil is the same as the polarity of the one surface of the second magnet.

11. The lens driving device of claim 8, wherein the third coil comprises a coil facing a lower surface of the third magnet.

12. The lens driving device of claim 6, wherein the first Hall sensor is configured to detect a movement of the first sensing magnet in a z-axis direction, and
wherein the second Hall sensor is configured to detect a movement of the second sensing magnet in the z-axis direction.

13. The lens driving device of claim 12, comprising third and fourth Hall sensors disposed on the third substrate and configured to sense the driving magnet,
wherein the third Hall sensor is configured to detect a movement of the driving magnet in an x-axis direction perpendicular to the z-axis direction, and
wherein the fourth Hall sensor is configured to detect a movement of the driving magnet in a y-axis direction perpendicular to both the z-axis direction and the x-axis direction.

14. The lens driving device of claim 5, comprising:
a first driver IC coupled to the first substrate and electrically connected with the first coil;
a second driver IC coupled to the second substrate and electrically connected with the second coil,
wherein the first driver IC comprises the first Hall sensor, and
wherein the second driver IC comprises the second Hall sensor.

15. The lens driving device of claim 14, comprising:
a first lower elastic member connecting the first bobbin and the housing and disposed below the first upper elastic member; and
a second lower elastic member connecting the second bobbin and the housing and disposed below the second upper elastic member,
wherein the first lower elastic member comprises two first lower elastic units electrically connecting the first driver IC and the first coil, and
wherein the second lower elastic member comprises two second lower elastic units electrically connecting the second driver IC and the second coil.

16. A lens driving device comprising:
a housing comprising a first hole and a second hole;
a first bobbin disposed in the first hole of the housing;
a second bobbin disposed in the second hole of the housing;
a first coil disposed on the first bobbin;
a second coil disposed on the second bobbin;
a first magnet disposed on the housing and facing the first coil, a second magnet facing the second coil, and a third magnet disposed between the first coil and the second coil;
a base disposed below the housing;
a first substrate disposed on the base;
a first upper elastic member connecting the first bobbin and the housing and comprising four first upper elastic units;
a second upper elastic member connecting the second bobbin and the housing and comprising four second upper elastic units;
four first wires connecting the four first upper elastic units and the first substrate; and
four second wires connecting the four second upper elastic units and the first substrate.

17. A lens driving device comprising:
a housing comprising a first hole and a second hole;
a first bobbin disposed in the first hole of the housing;
a second bobbin disposed in the second hole of the housing;
a first coil disposed on the first bobbin;
a second coil disposed on the second bobbin;
a driving magnet disposed on the housing and facing both the first coil and the second coil;
a first sensing magnet disposed on the first bobbin;
a second sensing magnet disposed on the second bobbin;
a first Hall sensor disposed on the housing and configured to sense the first sensing magnet; and
a second Hall sensor disposed on the housing and configured to sense the second sensing magnet,
wherein the housing comprises first and second lateral surfaces opposite to each other, third and fourth lateral surfaces opposite to each other, a first corner area between the first and third lateral surfaces, a second corner area between the second and third lateral surfaces, a third corner area between the second and fourth lateral surfaces, and a fourth corner area between the first and fourth lateral surfaces, wherein the first Hall sensor is disposed on the first corner area of the housing, and wherein the second sensing magnet is disposed on the fourth corner area of the housing.

18. The lens driving device of claim 17, comprising:
a first upper elastic member connecting the first bobbin and the housing and comprising four first upper elastic units; and
a second upper elastic member connecting the second bobbin and the housing and comprising four second upper elastic units,
wherein the first upper elastic units are electrically connected to the first Hall sensor, and
wherein the second upper elastic units are electrically connected to the second Hall sensor.

19. The lens driving device of claim 18, comprising:
a base disposed below the housing;
a third substrate disposed on the base;
a first wire connecting the first upper elastic member and the third substrate;
a second wire connecting the second upper elastic member and the third substrate;
a first driver IC disposed on the housing and electrically connected with the first coil;
a second driver IC disposed on the housing and electrically connected with the second coil;
a first lower elastic member connecting the first bobbin and the housing and disposed below the first upper elastic member; and
a second lower elastic member connecting the second bobbin and the housing and disposed below the second upper elastic member,
wherein the first driver IC comprises the first Hall sensor,
wherein the second driver IC comprises the second Hall sensor,
wherein the first lower elastic member comprises two first lower elastic units electrically connecting the first driver IC and the first coil, and wherein the second lower elastic member comprises two second lower elastic units electrically connecting the second driver IC and the second coil.

20. The lens driving device of claim 17, comprising:
a base disposed below the housing;
a third substrate disposed on the base; and
a third coil disposed on the third substrate and disposed at a position corresponding to the driving magnet,
wherein the driving magnet comprises a first magnet facing the first coil, a second magnet facing the second coil, and a third magnet disposed between the first coil and the second coil, and
wherein the third coil comprises a coil facing a lower surface of the third magnet.

21. A lens driving device comprising:
a housing comprising a first hole and a second hole;
a first bobbin disposed in the first hole of the housing;
a second bobbin disposed in the second hole of the housing;
a first coil disposed on the first bobbin;
a second coil disposed on the second bobbin;
a driving magnet disposed on the housing and facing both the first coil and the second coil;
a first sensing magnet disposed on the first bobbin;
a second sensing magnet disposed on the second bobbin;
a first substrate disposed on the housing;
a second substrate disposed on housing;
a first Hall sensor disposed on the first substrate and configured to sense the first sensing magnet; and
a second Hall sensor disposed on the second substrate and configured to sense the second sensing magnet,
wherein the housing comprises first and second lateral surfaces opposite to each other, third and fourth lateral surfaces opposite to each other, a first corner area between the first and third lateral surfaces, a second corner area between the second and third lateral surfaces, a third corner area between the second and fourth lateral surfaces, and a fourth corner area between the first and fourth lateral surfaces,
wherein the first substrate is disposed on the first corner area of the housing, and
wherein the second substrate is disposed on the fourth corner area of the housing.

* * * * *